UNITED STATES PATENT OFFICE.

AUGUSTE FERNBACH, OF PARIS, FRANCE.

TREATMENT OF LEMON-JUICE.

981,405.  Specification of Letters Patent. Patented Jan. 10, 1911.

No Drawing. Application filed June 23, 1910. Serial No. 568,552.

*To all whom it may concern:*

Be it known that I, AUGUSTE FERNBACH, a citizen of the Republic of France, residing at 26 Rue Dutot, Paris, XV, France, have invented a certain new and useful Treatment of Lemon-Juice, of which the following is a specification.

Lemon juice as it is obtained by expressing the fruits is eminently alterable. It is not only liable to be attacked by diverse micro-organisms, among which molds are predominant, but before it has undergone any alteration due to this cause it suffers a deeply seated modification of taste and odor due to oxidation. This is convincingly shown when fresh lemon juice is allowed to rest for several hours. For these reasons it has not hitherto been possible to preserve lemon juice in such a condition that it is adapted for the preparation of lemonade comparable in freshness of taste and aroma with that which can be made from the fresh juice. The facility with which the fresh juice oxidizes, particularly at a temperature relatively high, explains why pasteurized lemon juice is possessed of a disagreeable taste and odor which often render it unsuitable for consumption.

The present invention relates to a process by which the preservation of lemon juice becomes possible and a product is obtained having all the properties of the fresh juice. The process consists essentially in the concentration of the lemon juice under diminished pressure.

The fresh lemon juice is first filtered for the purpose of straining it from all suspended matter. It is then introduced into suitable apparatus which may be an ordinary vacuum pan and constructed of a material which is not attacked by the juice, in which apparatus the pressure is diminished to such a degree that the water in the juice can be distilled at a temperature not exceeding 35° C. This temperature is sufficiently low to prevent any modification of the taste of the juice. In order to avoid completely all oxidation prejudicial to the quality of the final product, a current of pure carbon dioxid is passed through the juice both during the operations which precede its concentration and during the concentration itself. The concentration is continued until the juice has been evaporated to one-tenth of its original volume. It varies according to the acidity of the original juice, but in any case the concentration must be pushed to such a degree that the final acidity of the concentrated juice prevents the attack of the juice by micro-organisms. The product thus obtained is completely sterile. After a suitable quantity of essence of lemons in alcoholic solution has been added to take the place of the volatile aromatic products which have disappeared during the concentration, the product may be preserved indefinitely in suitable receivers.

Experience shows that if the product be diluted with an appropriate quantity of water all the properties of fresh lemon juice are restored.

Having thus described the nature of my said invention and the best means I know of carrying the same into practical effect, I claim:—

1. A process of treating lemon juice, which process consists in first filtering the fresh juice in an atmosphere of pure carbon dioxid and then concentrating the filtered juice at a low temperature under diminished pressure and in a current of pure carbon dioxid.

2. A process of treating lemon juice, which process consists in first filtering the fresh juice in an atmosphere of pure carbon dioxid, then concentrating the filtered juice at a low temperature under diminished pressure and in a current of pure carbon dioxid, and then adding essence of lemons dissolved in alcohol.

In testimony whereof I have signed my name to this specification in the presence of two subscribing witnesses.

AUGUSTE FERNBACH. [L. S.]

Witnesses:
H. C. COXE,
JACK H. BAKER.